United States Patent [19]

Yoshida et al.

[11] 4,306,048

[45] Dec. 15, 1981

[54] METHOD FOR PREPARING ACRYLAMIDE POLYMERS

[75] Inventors: Norimasa Yoshida, Yokohama; Yasuo Ogawa, Kawasaki; Ryoji Handa, Yokosuka; Susumu Seki, Yokohama; Jun Hosoda, Yokohama; Nobuo Kurashige, Yokohama; Akihisa Furuno, Yokohama, all of Japan

[73] Assignees: Nitto Chemical Industry Co., Ltd.; Mitsubishi Rayon Co., Ltd., both of Tokyo, Japan

[21] Appl. No.: 176,031

[22] Filed: Aug. 7, 1980

[30] Foreign Application Priority Data

Aug. 21, 1979 [JP] Japan .................. 54-105572

[51] Int. Cl.³ .............................. C08J 3/12
[52] U.S. Cl. .................. 526/193; 526/211; 526/212; 526/214; 526/220; 526/222; 528/486; 528/487; 528/495; 526/303.1
[58] Field of Search ............. 526/193, 211, 214, 220, 526/222, 89, 303, 212; 525/1, 2, 3; 260/45.7 PH, 45.75, 45.95 H, 29.6 Z, 29.6 E; 528/487, 495, 486

[56] References Cited

U.S. PATENT DOCUMENTS

| | | | |
|---|---|---|---|
| 3,002,960 | 10/1961 | Kolodny | 526/211 |
| 3,222,335 | 12/1965 | Delacretaz | 526/193 |
| 3,755,280 | 8/1973 | Saunders | 528/487 |
| 3,951,934 | 4/1976 | Ohshima et al. | 526/211 |
| 3,969,329 | 7/1976 | Hirata et al. | 526/303 |
| 4,042,772 | 8/1977 | Ballweber et al. | 526/303 |
| 4,103,080 | 7/1978 | Bohmer et al. | 526/303 |
| 4,138,539 | 2/1979 | Landolt et al. | 526/303 |
| 4,154,910 | 5/1979 | Tanaka et al. | 526/303 |

FOREIGN PATENT DOCUMENTS

| | | | |
|---|---|---|---|
| 50-1195 | 1/1975 | Japan | 526/303 |
| 672204 | 7/1979 | U.S.S.R. | 526/303 |

Primary Examiner—Paul R. Michl
Attorney, Agent, or Firm—Cushman, Darby & Cushman

[57] ABSTRACT

In the production of a dried acrylamide polymer by polymerizing, in an aqueous medium, acrylamide alone or a monomer mixture comprising 50 mole % or more of acrylamide and at least one monomer copolymerizable therewith with a radical initiator, and then drying the resulting hydrous acrylamide polymer, the allowing of at least one of the following compounds [I], [II] and [III] to be present in the drying step or a step prior thereto enables the dried acrylamide polymer having a high molecular weight and a good dissolvability in water to be obtained:

[I] a non-polymerizable compound having in its molecule at least one group represented by the formula,

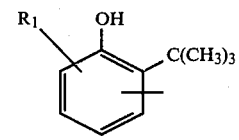

wherein $R_1$ is H or an alkyl group having up to 4 carbon atoms,

[II] a compound represented by the formula, $R_2$—S—$C_nH_{2n}X$ wherein n is an integer of 1 to 8, $R_2$ is an alkyl group, an aryl group or —$C_nH_{2n}X$, in which X is —OH, —COOH (or its salt), —CN or —$CONH_2$, and

[III] a compound represented by the formula,

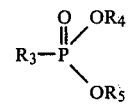

wherein $R_3$, $R_4$ and $R_5$ are H, alkali metals or alkyl or aryl groups.

12 Claims, No Drawings

METHOD FOR PREPARING ACRYLAMIDE POLYMERS

BACKGROUND OF THE INVENTION

1. Field of the Invention

This invention relates to a process for producing an acrylamide polymer having a high molecular weight containing only in a small amount the water-insoluble matters formed in the process of producing the polymer, particularly in the step of drying the polymer. More particularly, it relates to a process for obtaining a dried product of said polymer, which has a high molecular weight and is good in dissolvability in water, by polymerizing acrylamide alone or a monomer mixture comprising acrylamide and at least one monomer copolymerizable therewith in an aqueous medium and then drying the resulting hydrous polymer, characterized by allowing a specific phenol, thioether or phosphite to be present in the system in said polymerization step or in said drying step.

2. Description of the Prior Art

In recent years, water-soluble acrylamide polymers have come to be used in large amount in many fields, for example, as paper-strengthening agents, thickeners for paper-making, reagents for recovering petroleum, flocculants, and the like. Among these uses, thickeners for paper-making, flocculants and the like, in particular, require that the polymer has a very high molecular weight, and those having an average molecular weight of ten million or more are recently not rare.

Some methods for obtaining such an acrylamide polymer having a high molecular weight have been proposed, however, industrially, the polymerization is often effected with a free radical initiator in an aqueous medium. In this case, the hydrous polymer obtained usually contains 60–80% of water and is in the form of an aqueous solution, but it is a rubber-like substance which has substantially no fluidity or a viscous liquid difficult to flow because the molecular weight of the polymer is very high. Accordingly, the hydrous polymer as such is difficult to handle and uneconomical in transportation, and also it has the disadvantage that the rate of dissolution of the polymer in water when using the hydrous polymer is very low. Therefore, the aforesaid hydrous polymer is usually formed into a dried powder by removing water therefrom by some methods, and one of the methods of removing water is a method of heat-drying the hydrous polymer as obtained with hot air, or the like. This method is often industrially used because it is simple in principle and has many advantages even in respect of production. However, acrylamide polymers tend to be crosslinked between their molecules upon heating, and when this is caused between very high molecular weight molecules, even though a very slight amount of crosslinkage is formed, the dissolvability of the polymer in water is decreased.

When the decrease in dissolvability is slight, it can be compensated for by such a means as to prolong the dissolving time when the dried polymer is used. However, when the decrease is great, the polymer is only swollen even when stirred in water for a long time, and gives a solution containing many insoluble particles. Therefore, when said solution is used for treating waste water or the like as a flocculant only a low flocculating ability is shown, and when it is used as a thickener for paper-making, fish eyes are formed on the web formed. Accordingly, when such a high molecular weight hydrous polymer is dried, there is adopted, for example, a method of drying under reduced pressure or blowing air at a relatively low temperature of 60° C. or less.

However, it is desirable that the polymer is dried rapid at a temperature as high as possible, in respect of productivity, and, for this purpose, there have been proposed many agents for preventing insolubilization upon drying. However, it has been a common opinion that the formation of insoluble acrylamide polymers results from the formation of imide linkages between the polymer chains. Among the above proposals, it can be said that there is no case in which any insolubilization preventing measure is taken in addition to the prevention of the imide linkages from being formed.

SUMMARY OF THE INVENTION

As a result of extensive research on insolubilization of the polymer upon drying, it has been found that there is a crosslinkage which is considered to result from another mechanism which is difficult to explain based only on the formation of imide linkages, and considering that said another mechanism is a crosslinking between the main chains due to radical mechanism, there have been confirmed the effects of a group of antioxidants and synergistic agents which have never been applied to acrylamide polymers, whereby it has been discovered that these agents have remarkable effect of preventing the polymers from being insolubilized upon drying.

According to this invention, there is provided a method for preparing a dried high molecular weight acrylamide polymer, which comprises polymerizing, in an aqueous medium, acrylamide alone or a monomer mixture consisting of 50 mole % or more of acrylamide and at least one monomer copolymerizable therewith, with a radical initiator, and then drying the resulting hydrous acrylamide polymer, characterized by allowing at least one compound selected from the group consisting of the following compounds [I], [II] and [III] to be present in the drying step or a step prior thereto:

[I] a non-polymerizable compound having in its molecule at least one group represented by the formula,

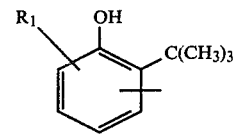

wherein $R_1$ is H or an alkyl group having up to 4 carbon atoms,

[II] a compound represented by the formula, $R_2-S-C_nH_{2n}X$, wherein n is an integer of 1 to 8, $R_2$ is an alkyl, aryl or $-C_nH_{2n}X$, and X is $-OH$, $-COOH$ (or its salt), $-CN$ or $-CONH_2$, and

[III] a compound represented by the formula,

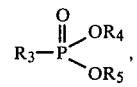

wherein $R_3$, $R_4$ and $R_5$ are independently H, alkali metals or alkyl or aryl groups.

DETAILED DESCRIPTION OF THE INVENTION

The compound [I] includes, for example, 2,6-di-t-butyl-4-carboxyphenol, 2,6-di-t-butyl-4-carboxymethylphenol, 2,6-di-t-butyl-4-methylphenol, 4-octadecyloxycarbonylethyl-2,6-di-t-butylphenol, tetrakis[3-(4-hydroxy-3,5-di-t-butylphenyl)propionyloxymethyl]methane, 2,2'-methylenebis(4-methyl-6-t-butylphenol), 4,4'-methylenebis(3,5-di-t-butylphenol), 4,4'-butylidenebis(5-methyl-2-t-butylphenol), octadecyl 3-(3,5-di-t-butyl-4-hydroxyphenyl)propionate, pentaerythrityl tetrakis[3-(3,5-di-t-butyl-4-hydroxyphenyl)propionate], 4,4'-thiobis(2-t-butyl-5-methylphenol, 2,2'-thiodiethyl bis[3-(3,5-di-t-butyl-4-hydroxyphenyl)propionate], and diethyl 3,5-di-t-butyl-4-hydroxybenzylphosphonate. Among them, preferred are 4,4'-thiobis(2-t-butyl-5-methylphenol and octyl 3-(3,5-di-t-butyl-4-hydroxyphenyl)propionate.

The compound [II] includes, for example, methylthioacetic acid, phenylthioacetic acid, 3-methylthiopropionic acid, 3-ethylthiopropionic acid, 3-phenylthiopropionic acid, thiodiacetic acid, 3,3'-thiodipropionic acid, 4,4'-thiodibutyric acid, 3-carboxymethylthiopropionic acid, 3-hydroxyethylthiopropionic acid and salts of these acids with alkali metals, alkaline earth metals, ammonium and the like, and amides of these acids. Among them, preferred are 3,3'-thiodipropionic acid, 3,3'-thiodipropionamide, 3-carboxymethylthiopropionamide, and 3-ethylthiopropionamide. The compound [III] includes, for example, trimethyl phosphite, triphenyl phosphite, diethyl phosphite, diphenyl phosphite, phosphorous acid and its salts, and the like. Among them, preferred are diethyl phosphite and sodium phosphite.

Among the above compounds, many of the compounds [I] have a low solubility in water. However, these compounds can exhibit their effects when they are dissolved in solvents which can dissolve the compounds and are miscible with water, for instance, acetone, and the resulting solution is added to the polymerization system or the resulting hydrous polymer or the compounds are added in the form of powder to the polymerization system or the resulting hydrous polymer. In this case, a surfactant may be used along with the compound. However, it is not necessary to disperse it in the molecular state.

In general, phenol compounds are considered to have an inhibitory effect on the radical polymerization. However, when the compound [I] is allowed to be present in the polymerization system no significant inhibitory effect is shown on the polymerization with not only an azo initiator but also a redox initiator.

Among the compounds [II], some of the compounds having a carbamoylethyl group can be formed in the polymerization system by adding a compound having a —SH group to the polymerization system to react it with the acrylamide monomer. However, in many cases, it is difficult to obtain a high molecular weight polymer owing to chain-transfer reaction being caused by the unreacted —SH group, and therefore, it is not advantageous.

Furthermore, to the compounds [I] to [III] may be added a known agent fo preventing insolubilization upon drying, such as, for example, triethanolamine, nitrilotrispropionic acid or its salt, nitrotrispropioninamide, dimethylaminopropionitrile, dimethylaminoethanol, glycine, N,N-dicarbamoylethylglycine, alanine, N,N-dimethyl-β-alanine, N-carbamoylethyldimethylamine, thiourea, 4,4'-azobis-4-cyanovaleric acid or the like, and it is rather effective.

The acrylaminde polymers of this invention can be obtained by polymerizing acrylamide alone or a monomer mixture comprising 50 mole % or more of acrylamide and at least one monomer copolymerizable therewith, and the monomer or monomers copolymerizable wiht acrylamide, include, for example, methacrylamide; acrylic acid; methacrylic acid; salts and aminoalkyl esters of acrylic and methacrylic acids; quaternary ammonium salts of the aminoalkyl esters of acrylic and methacrylic acids; ethylenesulfonic acid; acrylamidoalkylsulfonic acid and salts thereof; and acrylonitrile, styrene, lower alkyl esters of acrylic and methacrylic acids in amounts within such a range that the watersolubility of th produced polymer is not significantly impaired.

The polymerization method used in this invention is a conventional aqueous solution polymerization method using a free radical initiator, by which a peroxide such as a persulfate, hydrogen peroxide, an alkyl peroxide or the like; a redox type initiator prepared by combining such a peroxide with a reducing agent such as a tertiary amine, polyethylene polyamide, a sulfite, a ferrous or a ferric salt or the like; and/or an azo initiator such as azobisisobutyronitrile, 2,2'-azobis(2-amidinopropane) dihydrochloride, 4,4'-azobis(4-cyanovaleric acid) or the like is added to a 1 to 70% by weight, preferably 5 to 30% by weight, aqueous solution of acrylamide or the aforesaid monomer mixture, in an amount of 0.0001 to 0.2% by weight based on the weight of the monomer or monomer mixture, and the reaction is effected at a temperature of 0° to 100° C. The heat of polymerization may be removed or the temperature of the polymerization system may be allowed to rise.

There may also be used a method of the socalled w/o suspension polymerization by which an aqueous solution of the monomer or monomers is dispersed in the form of droplets in a solvent which hardly dissolves water and the monomer or monomers, such as an aliphatic hydrocarbon as long as the necessary amount of the compounds [I] to [III] id distributed to and held in the phase composed of the monomer or monomers and water.

When the compounds [I] to [III] are added to the polymerization system before the polymerization, good results are obtained in many cases. However, they may be kneaded with the hydrous polymer after the polymerization by means of a kneader or an extruder. The amount of the compound added is 0.001 to 10% by weight, preferably 0.01 to 5% by weight, based on the weight of the monomer or the polymer. The compound may be added in the powder or liquid form or in the form of a solution or suspension in water or an organic medium, to the polymerization system or the resulting hydrous polymer, followed by stirring the resulting mixture.

The acrylamide polymers is often subjected to hydrolysis after the polymerization to convert a part of the amide group into carboxyl group, and the polymer thus hydrolyzed is used in many fields. In this case, the compounds [I] to [III] have an effect of preventing the polymer from being deteriorated during the hydrolysis step.

Prior to drying the hydrous polymer thus obtained, the polymer is properly shaped into a film, a string or particled depending upon the fluidity of the polymer, and the shaped product is sent to a heatdrier wherein to dry the same. As the heat-dryer, there may be used those of all types such as an allowing-to-stand type, a stirring type, a continuous type, a batch type, an atmospheric-pressure type, a reduced-pressure type, and the like. As the temperature of the drying atmosphere, as relatively low a temperature as about 60° C. has heretofore been employed. However, in this invention, as high a temperature as 80° to 130° C. can be employed. However, it is desirable to confine the drying time to the necessary and minimum period while ascertaining the temperature and water content of the polymer per se because the polymer is liable to become insolubilized when held in the drying atmosphere for a long period of time after the temperature of the polymer per se reaches a temperature higher than 100° C.

followed by adding 0.005 part of potassium persulfate and 0.05 part of dimethylaminopropionitrile at 20° C. The resulting mixture was subjected to polymerization at 20° C.

The resulting hydrous polymer was minced into pieces having a diameter of about 3 mm, and then dried at 90° C. for 10 hours by means of a hot air drier, after which the dried polymer was pulverized into particles having a diameter of 2 mm or less by means of Wiley's mill. The Brookfield viscosity of a 1% aqueous solution of the particles (referred to hereinafter as 1% B-type viscosity) was determined and, simultaneously therewith, the dissolvability of the polymer was examined with the naked eye.

The results obtained are as shown in Table 1.

TABLE 1

| Example No. | Compound Name | Amount added (part) | 1% B-type viscosity (cps) | Dissolvability |
|---|---|---|---|---|
| 1 | 2,6-Di-t-butyl-4-methylphenol | 0.02 | 4,960 | Good |
| 2 | 2,6-Di-t-butyl-4-methylphenol 3,3'-Thiodipropionic acid | 0.02 0.02 | 4,960 | Good |
| 3 | 4'4-Thiobis(2-t-butyl-5-methylphenol) | 0.02 | 4,910 | Good |
| 4 | 2,2'-Thiodiethyl bis[3-(3,5-di-t-butyl-4-hydroxyphenyl)propionate] | 0.01 | 4,220 | Good |
| 5 | Diethyl 3,5-di-t-butyl-4-hydroxy-benzylphosphonate | 0.01 | 3,930 | Good |
| 6 | 3-Methylthiopropionic acid | 0.03 | 4,250 | Good |
| 7 | 3-Ethylthiopropionamide | 0.03 | 4,750 | Good |
| 8 | 3-Carboxymethylthiopropionic acid | 0.03 | 4,175 | Good |
| 9 | 3-Carboxymethylthiopropionamide | 0.03 | 4,860 | Good |
| 10 | Thiodiacetic acid | 0.03 | 4,560 | Good |
| 11 | 3,3'-Thiodipropionic acid | 0.01 | 4,740 | Somewhat bad |
| 12 | 3,3'-Thiodipropionic acid | 0.03 | 4,650 | Good |
| 13 | 3,3'-Thiodipropionamide | 0.01 | 4,940 | Somewhat bad |
| 14 | 3,3'-Thiodipropionamide | 0.03 | 5,000 | Good |
| 15 | Diethyl phosphite | 0.03 | 4,240 | Good |
| 16 | Trimethyl phosphite | 0.02 | 3,970 | Good |
| 17 | Triphenyl phosphite | 0.02 | 4,030 | Good |
| 18 | Octadecyl 3-(3,5-di-t-butyl-4-hydroxyphenyl)propionate | 0.01 | 4,800 | Good |
| 19 | Pentaerythrityl tetrakis[3-(3,5-di-t-butyl-4-hydroxyphenyl)propionate] | 0.01 | 4,180 | Good |

DESCRIPTION OF THE PREFERED EMBODIMENT

This invention is specifically explained below referring to Examples, which are not by way of limitation but by way of illustration.

In the Examples, parts and percentages are all by weight unless otherwise specified.

In the Examples and Comparative Examples, the dissolvability was determined as follows: 0.5 g of the dried polymer obtained was added to 500 ml of water and the mixture was stirred at room temperature for 4 hours and then filtered through a wire gauze of 80 mesh, after which the residue on the wire gauze was washed with water. The weight of the insoluble swollen gel on the wire gauze was measured. When the weight was 10 g or less, the polymer was judged to be good in dissolvability in water.

EXAMPLES 1 to 19

To an aqueous monomer solution consisting of 20 parts of acrylamide and 80 parts of ion-exchanged water was added one of the compounds shown in Table 1 in the amount indicated in Table 1, and the pH of the solution obtained was adjusted to 7, after which the air in the polymerization system was replaced by nitrogen,

COMPARATIVE EXAMPLE 1

To an aqueous monomer solution consisting of 20 parts of acrylamide and 80 parts of ion-exchanged water was added 0.05 part of nitrilotrispropionamide, and the pH thereof was adjusted to 7, after which the air in the system was replaced by nitrogen. Thereto were added 0.005 part of potassium persulfate and 0.005 part of dimethylaminopropionitrile at 20° C., and the resulting mixture was subjected to polymerization.

The hydrous polymer thus obtained was minced to pieces of about 3 mm in diameter, and the pieces were divided into two. One of them was dried for 16 hrs by means of a hot air drier at 60° C., and the other was dried for 10 hrs by a hot air drier at 90° C.

The respective dried polymers were pulverized to particles of not more than 2 mm in diameter by means of Wiley's mill, and dissolved in water to obtain a 1% solution. The polymer dried at 60° C. became a uniform solution, and the 1% B-type viscosity thereof was 3,620 cps. On the other hand, the polymer dried at 90° C. was only swollen into a jelly, and did not become a uniform solution

EXAMPLE 20

To an aqueous monomer solution consisting of 20 parts of acrylamide and 80 parts of ion-exchanged water were added 0.05 part of 3,3'-thiodiproionic acid, and 0.02 part of nitrilotrispropionamide, and the pH thereof was adjusted to 7, after which the air in the system was replaced by nitrogen. Thereto was added 0.005 part of 2,2'-azobis(2-amidinopropane) dihydrochloride at 25° C., and the resulting mixture was subjected to polymerization. The subsequent procedures were the same as in Examples 1 to 19.

The 1% B-type viscosity of the resulting polymer was 3,920 cps, and the polymer was good in dissolvability.

When 3,3'-thiodipropionic acid was not added, the 1% B type viscosity was 3,980 cps and the polymer was bad in dissolvability.

EXAMPLE 21

To an aqueous monomer solution consisting of 20 parts of acrylamide and 80 parts of ion-exchanged water were added 0.03 part of 3,3'-thiodipropionic acid and 0.02 part of nitrilotrispropionamide and the pH of the resulting solution was adjusted to 7, after which the air in the system was replaced by nitrogen. To the solution were then added 0.005 part of 2,2'-azobis(2-amindinopropane) dihydrochloride and 0.01 part of 4,4'-azobis(4-cyanovaleric acid) at 25° C. and the resulting mixture was subjected to polymerization.

The resulting polymer was subsequently treated in the same manner as in Examples 1to 19.

The 1% B-type viscosity of the resulting polymer was 4,030 cps and the polymer was good in dissolvability.

When 3,3'-thiodipropionic acid was not added, the 1% B-type viscosity was 4,100 cps and the dissolvability thereof was bad.

EXAMPLE 22

To an aqueous monomer solution consisting of 16 parts of acrylamide, 4 parts of 2-acrylamido-2-methylpropanesulfonic acid and 80 parts of ion-exchanged water was added 0.03 part of 3,3'-thiodipropionic acid, and the pH of the resulting solution was adjusted to 7 with sodium hydroxide, after which the air in the system was replaced by nitrogen. To the solution were added 0.004 part of 2,2'-azobis(2-amidinopropane) dihydrochloride and 0.01 part of 4,4'-azobis(4-cyanovaleric acid) at 25° C., and the resulting mxiture was subjected to polymerization. The polymer thus obtained was treated in the same manner as in Examples 1 to 19.

The resulting polymer had a 1% B type voscosity of 7,600 cps and was good in dissolvability.

When 3,3'-thiodipropionic acid was not added, the 1% B-type viscosity was 7,650 cps, and the dissolvability was bad.

As is clear from the above Examples and Comparative Examples, dried acrylamide polymers having a very high molecular weight and a good dissolvability were obtained by adding the above-mentioned compounds prior to the polymerization.

The 3-ethylthiopropionamide used in Example 7, the 3-carboxymethylthiopropionamide used in Example 9 and the thiodipropionamide used in Examples 13 and 14 are easily prepared by reacting acrylamide with ethylmercaptane, thioglycolic acid and sodium (hydro) sulfide, respectively, and as mentioned above, the addition of these compounds directly to the polymerization system is not always advantageous. For example, when the 3-carboxymethylthiopropionamide was replaced by the equimolar amount of thioglycolic acid in Example 9, the resulting polymer was good in dissolvability, but it had a 1% B-type viscosity of 3,300 cps, which is greatly lower than that of the polymer obtained by use of 3-carboxymethylthiopropionamide. This is perhaps considered to be due to chain transfer by unreacted —SH group.

EXAMPLES 23 to 31 AND COMPARATIVE EXAMPLES 2 to 3

The oxygen dissolved in the aqueous monomer solution consisting of 9 parts of acrylamide and 91 parts of ion-exchanged water was replaced by nitrogen, and thereto were added 0.003 part of potassium persulfate and 0.003 part of dimethylaminopropionitrile at 30° C., and the resulting mixture was subjected to polymerization. To the resulting viscous aqueous polymer solution were added 0.3 part of sodium hydroxide and 0.05 part of one of the compounds indicated in Table 2, and the mixture was kneaded by a kneader at 65° C. for 3 hrs to effect a partial hydrolysis, after which the product was dried at 120° C. for 5 hrs by means of a hot air drier and then pulverized by Wiley's mill into particles of not more than 2 mm in diameter. The B-type viscosity of 0.1% aqueous solution of the particles was measured and the dissolvability thereof was determined with the naked eye. The results obtained are shown in Table 2.

TABLE 2

| Example No. | Compound | B-type viscosity of 0.1% aqueous polymer solution (cps) | Dissolvability |
| --- | --- | --- | --- |
| 23 | 3-Carboxymethylthiopropionamide | 600 | Good |
| 24 | 3-Ethylthiopropionamide | 620 | Good |
| 25 | Thiodipropionic acid | 550 | Somewhat bad |
| 26 | Diethyl 3,5-di-t-butyl-4-hydroxy-benzylphosphonate | 690 | Good |
| 27 | 2,6-Di-t-butyl-4-methylphenol | 730 | Somewhat bad |
| 28 | 2,2'-Thiodiethyl bis[3-(3,5-di-t-butyl-4-hydroxyphenyl)propionate] | 700 | Good |
| 29 | Sodium phosphite | 570 | Good |
| 30 | Diethyl phosphite | 520 | Good |
| 31 | Trimethyl phosphite | 600 | Good |
| Comp. Ex. 2 | None | 610 | Bad |
| Comp. | Thioglycolic acid | 400 | Bad |

TABLE 2-continued

| Example No. | Compound | B-type viscosity of 0.1% aqueous polymer solution (cps) | Dissolvability |
|---|---|---|---|
| Ex. 3 | | | |

In Comparative Example 2 in Table 2 in which none of the compounds indicated in Table 2 was added, the polymer obtained by drying at 60° C. for 16 hrs had a good dissolvability, but when the polymer was dried at 120° C. for 5 hrs, which were severe drying conditions, the polymer was insolubilized.

In Comparative Example 3, in which thioglycolic acid was added, a considerable reduction in viscosity was observed between the hydrolysis step and the drying step. Further, the dissolvability of the polymer was bad and no drying stabilization effect was observed. However, when 3-carboxylmethylthiopropionamide which is the thioglyolic acid adduct of acrylamide was used, no viscosity reduction was caused and the dissolvability after drying was good.

When a phenolic stabilizer was added as in Examples 26, 27 and 28, the viscosity was higher than that in Comparative Example 2 in which none of the compounds was added. This is considered to be because the degradation (lowering of molecular weight) was inhibited in the course of from the hydrolysis to drying.

What is claimed is:

1. A method for preparing a dried high molecular weight acrylamide polymer, which comprises polymerizing acrylamide alone or a monomer mixture consisting of 50 mole % or more of acrylamide and at least one monomer copolymerizable therewith with a radical initiator in an aqueous medium and drying the resulting hydrous acrylamide polymer, characterized by allowing at least one compound selected from the group consisting of the following compounds [I], [II], and [III] to be present in the drying step or a step prior thereto:

[I] a non-polymerizable compound having in its molecular at least one group represented by the formula,

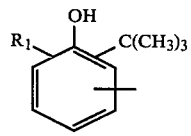

wherein $R_1$ is H or an alkyl group having up to 4 carbon atoms, the compound [I] being such that the acrylamide polymer formed has a high molecular weight and good solubility in water,

[II] a compound represented by the formula $R_2$—S—$C_nH_{2n}X$, wherein n is an integer of 1 to 8, $R_2$ is an alkyl, aryl or —$C_nH_{2n}X$, and X is —OH, —COOH (or its salt), —CN or —COHN$_2$, and

[III] a compound represented by the formula

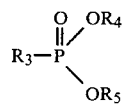

wherein $R_3$, $R_4$, and $R_5$ are independently H, alkali metals, or alkyl or aryl groups, the total amount of said at least one compound being 0.001 to 10% by weight of the monomer or the polymer.

2. A method according to claim 1, wherein the non-polymerizable compound [I] is selected from the group consisting of 2,6-di-t-butyl-4-carboxylphenol, 2,6-di-t-butyl-4-carboxymethylphenol, 2,6-di-t-butyl-4-methylphenol, 4-octadecyloxycarbonylethyl-2,6-di-t-butylphenol, tetrakis[3-(4-hydroxy-3,5-di-t-butylphenyl)-propionyloxymethyl]-methane, 2,2'-methylenebis(4-methyl-6-t-butylphenol),4,4'-methylenebis(3,5-di-t-butylphenol), 4,4'-butylidenebis(5-methyl-2-t-butylphenol), octadecyl 3-(3,5-di-t-butyl-4-hydroxyphenyl)propionate, pentaerythrityl tetrakis[3-(3,5-di-t-butyl-4-hydroxyphenyl)propionate], 4,4'-thiobis(2-t-butyl-5-methylphenol),2,2'-thiodiethyl bis[3-(3,5-di-t-butyl-4-hydroxyphenyl)propionate], and diethyl 3,5-di-t-butyl-4-hydroxybenzylphosphonate; the compound [II] is selected from the group consisting of methylthioacetic acid, phenylthioacetic acid, 3-methylthiopropionic acid, 3-ethylthiopropionic acid, 3-phenylthiopropionic acid, thiodiacetic acid, 3,3'-thiodipropionic acid, 4,4'-thiodibutyric acid, 3-carboxymethylthiopropionic acid, 3-hydroxyethylthiopropionic acid, and alkali metal salts, alkaline earth metal salts and ammonium salts of these acids and amides of these acids; and the compound [III] is selected from the group consisting of trimethyl phosphite, triphenylphosphite, diethylphosphite, diphenylphosphite, phosphorous acid and salts thereof.

3. A method according to claim 1, wherein the non-polymerizable compound [I] is selected from the group consisting of 4,4'-thiobis(2-t-butyl-5-methylphenol) and octadecyl 3-(3,5-di-t-butyl-4-hydroxyphenyl)propionate; the compound [II] is selected from the group consisting of 3,3'-thiodipropionic acid, 3,3'-thiodipropionamide, 3-carboxymethylthiopropionamide and 3-ethylthiopropionamide; and the compound [III] is selected from the group consisting of diethyl phosphite and sodium phosphite.

4. A method according to claim 1, wherein the monomer copolymerizable with acrylamide is selected from the group consisting of methacrylamide, acrylic acid, methacrylic acid, salts and aminoalkyl esters of acrylic and methacrylic acids, quaternary ammonium salts of the aminoalkyl esters of acrylic and methacrylic acids, ethylenesulfonic acid, acrylamidealkylsulfonic acids and their salts, and such amounts of acrylonitrile, styrene, lower alkyl acrylates and methacrylates that the water-solubility of the produced polymer is not significantly impaired.

5. A method according to claim 1, wherein the monomer concentration in the polymerization step is 1 to 70 % by weight.

6. A method according to claim 1, wherein the monomer concentration in the polymerization step is 5 to 30% by weight.

7. A method according to any one of claim 1, wherein the amounts of the compound having a group represented by the formula [I] and the compound represented by the formulas [II] and [III] added are 0.01 to 5% by weight based on the weight of the monomer or the polymer.

8. A method according to any one of claim 1, wherein the compound [I] or the compound [II] or [III] is added prior to the polymerization.

9. A method according to claim 1 wherein the compound present has formual I.

10. A method according to claim 1 wherein the compound present has formula II.

11. A method according to claim 1 wherein the compound present has formula III.

12. A method according to claim 1 wherein the compound of formula I has the formula AX where A is

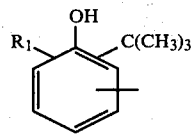

and X is —COOH, —CH$_2$COOH, —CH$_2$CH$_2$COOC$_{18}$H$_{37}$ or

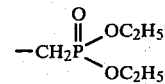

or the compound of formula I has the formula

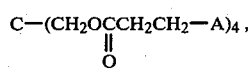

A—CH$_2$—A, A,4,4'-butylidene-A, A—S—A or (A CH$_2$CH$_2$OOCCH$_2$CH$_2$)$_2$ S.

* * * * *

UNITED STATES PATENT AND TRADEMARK OFFICE
CERTIFICATE OF CORRECTION

PATENT NO. : 4,306,048

DATED : December 15, 1981

INVENTOR(S) : Norimasa Yoshida, Yasuo Ogawa, Ryoji Handa, Susumu Seki, Jun Hosoda, Nobuo Kurashige, Akihisa Furuno It is certified that error appears in the above—identified patent and that said Letters Patent is hereby corrected as shown below:

In the Assignee, item 73 of the cover sheet

"both" should read -- and Diafloc Co., Ltd., all --.

Signed and Sealed this

Sixth Day of July 1982

[SEAL]

Attest:

GERALD J. MOSSINGHOFF

Attesting Officer

Commissioner of Patents and Trademarks